(12) United States Patent
Lim et al.

(10) Patent No.: US 7,912,362 B2
(45) Date of Patent: Mar. 22, 2011

(54) OPTICAL IMAGE STABILIZING APPARATUS FOR MICRO-CAMERA MODULE

(75) Inventors: Soo Cheol Lim, Incheon-si (KR); Jae Ho Moon, Yongin-si (KR); Ho Seop Jeong, Seongnam-si (KR); Jae Hyuk Park, Yongin-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 156 days.

(21) Appl. No.: 12/292,851

(22) Filed: Nov. 26, 2008

(65) Prior Publication Data

US 2009/0303595 A1    Dec. 10, 2009

(30) Foreign Application Priority Data

Jun. 9, 2008    (KR) .................. 10-2008-0053717

(51) Int. Cl.
*G03B 17/00*    (2006.01)
*H04N 5/228*    (2006.01)
*G02B 27/64*    (2006.01)

(52) U.S. Cl. ................ 396/55; 348/208.11; 359/557

(58) Field of Classification Search ............... 396/55; 359/554, 557; 348/208.99, 208.4, 208.7, 348/208.11
See application file for complete search history.

(56) References Cited

U.S. PATENT DOCUMENTS

| 7,319,815 | B2 * | 1/2008 | Seo ................. 396/55 |
| 7,444,072 | B2 * | 10/2008 | Seo ................. 396/55 |
| 7,643,741 | B2 * | 1/2010 | Sekino .............. 396/55 |
| 2007/0189743 | A1 * | 8/2007 | Chou et al. ........... 396/55 |
| 2008/0080052 | A1 * | 4/2008 | Suzuki ............. 359/554 |
| 2009/0052037 | A1 * | 2/2009 | Wernersson ........... 359/554 |

FOREIGN PATENT DOCUMENTS

| KR | 10-2007-0061394 | 6/2007 |
| KR | 10-2007-0120307 | 12/2007 |

* cited by examiner

*Primary Examiner* — W. B. Perkey
*Assistant Examiner* — Noam Reisner

(57) ABSTRACT

The present invention relates to an optical image stabilizing apparatus for a micro-camera module capable of effectively stabilizing an image of the camera module and implementing miniaturization of the camera module by supplying an "L"-shaped biaxial guide structure to prevent a tilt in a Y axial direction while moving an automatic focusing unit of the camera module in a horizontal X axial direction and to prevent a tilt in an X axial direction while moving the automatic focusing unit of the camera module in a horizontal Y axial direction.

12 Claims, 3 Drawing Sheets

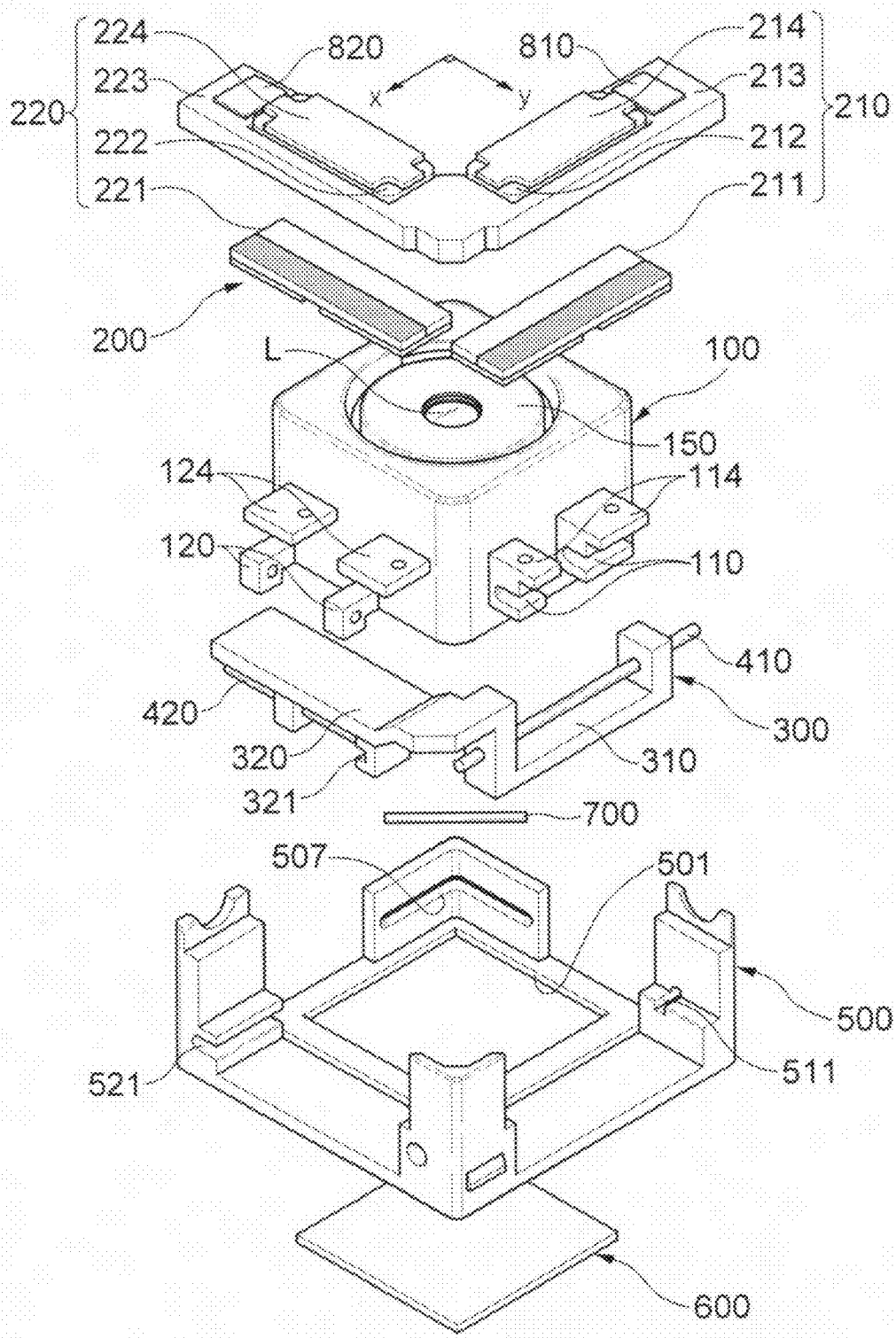
[FIG. 1]

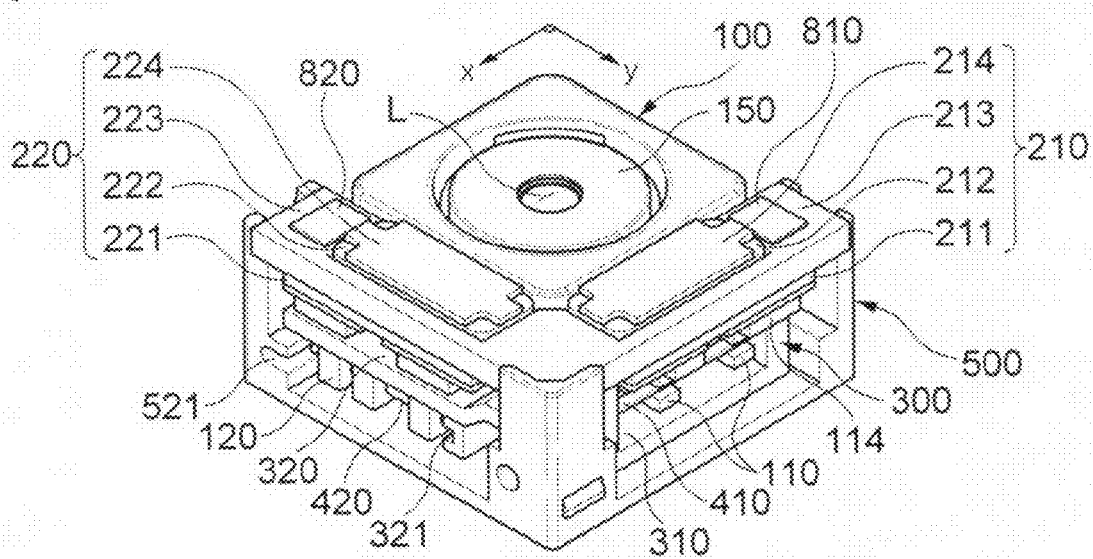
[FIG. 2]
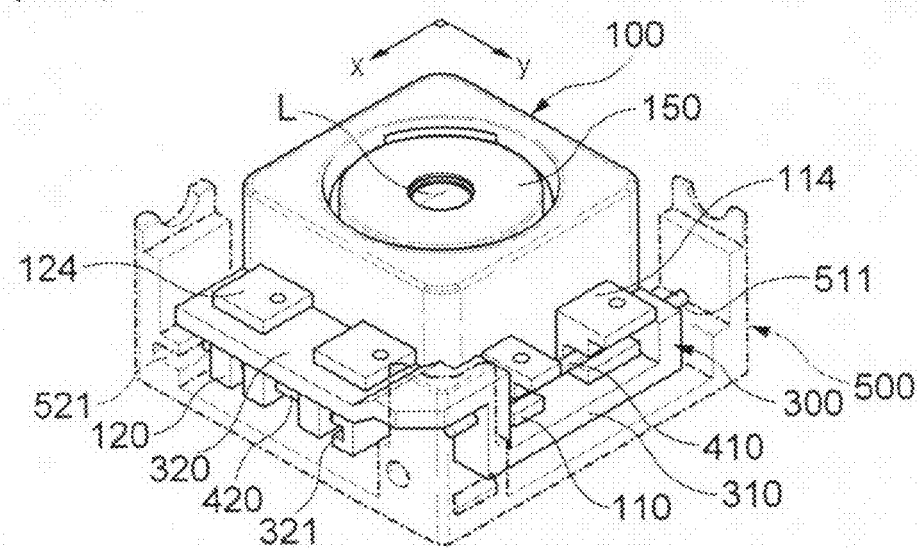
[FIG. 3]

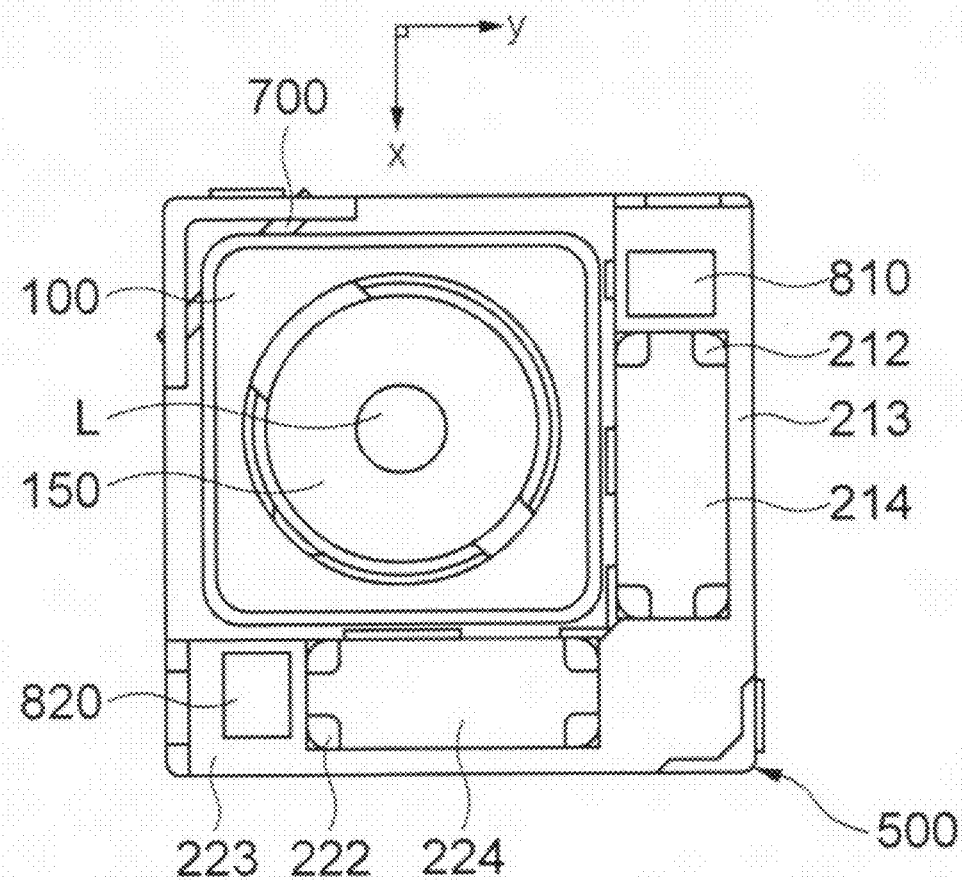
[FIG. 4]

OPTICAL IMAGE STABILIZING APPARATUS FOR MICRO-CAMERA MODULE

CROSS-REFERENCE TO RELATED APPLICATIONS

This application claims the benefit of Korean Patent Application No. 10-2008-0053717 filed with the Korea Intellectual Property Office on Jun. 9, 2008, the disclosure of which is incorporated herein by reference.

BACKGROUND OF THE INVENTION

1. Field of the Invention

The present invention relates to an optical image stabilizing apparatus for a micro-camera module; and, more particularly, to an optical image stabilizing apparatus for a micro-camera module capable of effectively stabilizing an image of the camera module and implementing miniaturization of the camera module by supplying an "L"-shaped biaxial guide structure to prevent a tilt in a Y axial direction while moving an automatic focusing unit of the camera module in a horizontal X axial direction and to prevent a tilt in an X axial direction while moving the automatic focusing unit of the camera module in a horizontal Y axial direction.

2. Description of the Related Art

Generally, an image stabilizing apparatus has been used to prevent deterioration of image quality due to a shake in shooting of a camera module.

Most of conventional image stabilizing apparatuses have been implemented in digital cameras because it was to easy to apply the image stabilizing apparatuses to the digital cameras in comparison with mobile small camera modules such as cellular phones in terms of a size.

Recently, as the mobile small camera module implementing an image with such high quality as that of an image in the digital camera has been demanded, development and study for applying the image stabilizing apparatus to the mobile small camera module have been progressed.

Most of the conventional image stabilizing apparatuses have been applied to the digital cameras and generally classified into four methods, that is, firstly, a moving method of an image stabilizing optical lens, secondly, an image sensor moving method, thirdly, a prism refraction method, and fourthly, a method for entirely leaning the camera module to cope with the shake.

However, the moving method of the image stabilizing optical lens complicates a redesign in changing an optical design due to driving of a corresponding optical lens, the image sensor moving method needs high driving precision and causes noise due to heat generation, the prism refraction method increases a cost and deteriorates image quality, and the method for entirely leaning the camera module to cope with the shake complicates construction of a product and causes a durability problem.

Particularly, the conventional image stabilizing methods applied to the digital cameras have a disadvantage of sharply increasing a size when applied to the mobile small camera modules.

SUMMARY OF THE INVENTION

The present invention has been invented in order to overcome the above-described disadvantages and problems of the conventional image stabilizing apparatuses for camera modules and it is, therefore, an object of the present invention to provide an optical image stabilizing apparatus for a micro-camera module capable of effectively stabilizing an image of the camera module and implementing miniaturization of the camera module by supplying an "L"-shaped biaxial guide structure to prevent a tilt in a Y axial direction while moving an automatic focusing unit of the camera module in a horizontal X axial direction and to prevent a tilt in an X axial direction while moving the automatic focusing unit of the camera module in a horizontal Y axial direction.

In accordance with one aspect of the present invention to achieve the object, there is provided an optical image stabilizing apparatus for a micro-camera module including; an automatic focusing unit mounting a lens barrel with a lens group; a driving unit for moving the automatic focusing unit in a horizontal X axial direction or a horizontal Y axial direction; and a biaxial guide having an X axial guide unit supported to an X axial shaft for supporting movement of the automatic focusing unit in the horizontal X axial direction to be moved in an X axial direction and a Y axial guide unit which fixes one side of a Y axial shaft for supporting movement of the automatic focusing unit in the horizontal Y axial direction and is extended in a direction perpendicular to the X axial guide unit.

The optical image stabilizing apparatus for the micro-camera module may further include a housing supplying a space to install the automatic focusing unit, the driving unit and the biaxial guide and including an X axial shaft fixing unit fixing both sides of the X axial shaft and a Y axial shaft moving unit supporting the other side of the Y axial shaft to move it in the X axial direction.

Herein, the X axial shaft fixing unit may include a plurality of grooves to insert and fix the both sides of the X axial shaft.

Further, the Y axial shaft moving unit may include a slit-shaped groove having a length in the X axial direction to insert and support the other side of the Y axial shaft.

The optical image stabilizing apparatus for the micro-camera module may further include a tilt preventing member to prevent a tilt of the automatic focusing unit by being provided at a corner opposing the biaxial guide among corners of the housing.

Herein, the tilt preventing member is detachably coupled to the corner of the housing and formed by a bar coupled to an insertion groove formed at a corner of the automatic focusing unit corresponding to the corner of the housing.

Meanwhile, it is preferable to form an X axial shaft coupling unit coupled to the X axial shaft on a side face of the automatic focusing unit corresponding to the X axial shaft and to form a Y axial shaft coupling unit coupled to the Y axial shaft on another side face of the automatic focusing unit corresponding to the Y axial shaft.

Herein, the X axial shaft coupling unit is slid in an axial direction of the X axial shaft in moving the automatic focusing unit in the horizontal X axial direction and slid in a circumferential direction of the X axial shaft in moving the automatic focusing unit in the horizontal Y axial direction.

Further, the Y axial shaft coupling unit is moved in a moving direction of the automatic focusing unit together with the Y axial shaft in moving the automatic focusing unit in the horizontal X axial direction and slid in an axial direction of the Y axial shaft in moving the automatic focusing unit in the horizontal Y axial direction.

Meanwhile, the driving unit may include a Y axial moving actuator for moving the automatic focusing unit in the horizontal Y axial direction by being installed on a lateral side of the automatic focusing unit corresponding to the X axial shaft and an X axial moving actuator for moving the automatic focusing unit in the horizontal X axial direction by being installed on another lateral side of the automatic focusing unit corresponding to the Y axial shaft.

Herein, the X and Y axial moving actuators may include magnets fixed to the automatic focusing unit and voice coils installed at upper parts of the magnets respectively.

Meanwhile, it is preferable that the one side of the Y axial shaft is bonded and fixed to the Y axial guide unit of the biaxial guide.

The optical image stabilizing apparatus for the micro-camera module may further include a position detection device provided on the driving unit to detect a moving position of the automatic focusing unit in the horizontal X axial direction or a moving position thereof in the horizontal Y axial direction.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a schematic exploded perspective view illustrating an optical image stabilizing apparatus for a micro-camera module in accordance with one embodiment of the present invention;

FIG. 2 is a schematic combined perspective view illustrating the optical image stabilizing apparatus for the micro-camera module in accordance with the one embodiment of the present invention;

FIG. 3 is a perspective view illustrating a housing after removing a driving unit in FIG. 2; and FIG. 4 is a plane-view of FIG. 2.

DETAILED DESCRIPTION OF THE PREFERABLE EMBODIMENTS

Hereinafter, a preferable embodiment of an optical image stabilizing apparatus for a micro-camera module in accordance with the present invention will be described in detail with reference to the accompanying drawings.

FIG. 1 is a schematic exploded perspective view illustrating an optical image stabilizing apparatus for a micro-camera module in accordance with one embodiment of the present invention, FIG. 2 is a schematic combined perspective view illustrating the optical image stabilizing apparatus for the micro-camera module in accordance with the one embodiment of the present invention, FIG. 3 is a perspective view illustrating a housing after removing a driving unit in FIG. 2 and FIG. 4 is a plane-view of FIG. 2.

Embodiment of an Optical Image Stabilizing Apparatus for a Micro-Camera Module

As shown in FIG. 1, in accordance with one embodiment of the present invention, an optical image stabilizing apparatus for a micro-camera module includes an automatic focusing unit 100, a driving unit 200, a biaxial guide 300, an X axial shaft 410, a Y axial shaft 420, and a housing 500.

As shown in FIG. 2 and FIG. 3, more specifically, the automatic focusing unit 100, as a unit to perform an automatic focusing function of the camera module, includes a lens barrel 150 having a lens group L coupled by stacking at least one lens inside.

Although not shown specifically, the automatic focusing unit 100 performs the automatic focusing function of the camera module by moving the lens barrel 150 by various driving methods such as a voice coil actuator, a piezoelectric actuator, or an actuator using a shape memory alloy.

Meanwhile, it is preferable that an X axial shaft coupling unit 110 coupled to the X axial shaft 410 is formed on a side face of the automatic focusing unit 100 corresponding to the X axial shaft 410 and a Y axial shaft coupling unit 120 coupled to the Y axial shaft 420 is formed on another side face of the automatic focusing unit 100 corresponding to the Y axial shaft 420.

Herein, the X axial shaft coupling unit 110 is slid in an axial direction of the X axial shaft 410 in moving the automatic focusing unit 100 in the horizontal X axial direction and slid in a circumferential direction of the X axial shaft 410 in moving the automatic focusing unit 100 in the horizontal Y axial direction.

That is, the X axial shaft coupling unit 110 may be formed in a loop shape opened to an outside of the automatic focusing unit 100.

And, the Y axial shaft coupling unit 120 is moved together with the Y axial shaft 420 in a moving direction of the automatic focusing unit 100 in moving the automatic focusing unit 100 in the horizontal X axial direction and slid in an axial direction of the Y axial shaft 420 in moving the automatic focusing unit 100 in the horizontal Y axial direction.

That is, the Y axial shaft coupling unit 120 may be formed by a protrusion portion with holes into which the Y axial shaft 420 is inserted and coupled.

The driving unit 200, as a unit to move the automatic focusing unit 100 in the horizontal X axial direction or the horizontal Y axial direction, includes a Y axial moving actuator 210 for moving the automatic focusing unit 100 in the horizontal Y axial direction by being installed on a lateral side of the automatic focusing unit 100 corresponding to the X axial shaft 410 and an X axial moving actuator 220 for moving the automatic focusing unit 100 in the horizontal X axial direction by being installed on another lateral side of the automatic focusing unit 100 corresponding to the Y axial shaft 420.

Herein, the Y axial moving actuator 210 includes a magnet 211 fixed to a Y axial moving actuator mounting unit 114 of the automatic focusing unit 100 and a voice coil 212 installed at an upper part of the magnet 211.

At this time, the voice coil 212 is fixed to a coil holder 213 and a yoke 214 is installed at an upper part of the voice coil 212.

Further, the X axial moving actuator 220 similar to the Y axial moving actuator 210 includes a magnet 221 fixed to an X axial moving actuator mounting unit 124 of the automatic focusing unit 100 and a voice coil 222 installed at an upper part of the magnet 221.

At this time, the voice coil 222 is fixed to a coil holder 223 and a yoke 224 is installed at an upper part of the voice coil 222.

Meanwhile, the driving unit 200 may further include a position detection sensor to detect a moving position of the automatic focusing unit 100 in the horizontal X axial direction or a moving position thereof in the horizontal Y axial direction.

At this time, the position detection sensor includes a Hall sensor 820 which is mounted to the coil holder 223 mounting the voice coil 222 of the X axial moving actuator 220 to detect the moving position of the automatic focusing unit 100 in the horizontal X axial direction and a Hall sensor 810 which is mounted to the coil holder 213 mounting the voice coil 212 of the Y axial moving actuator 210 to detect the moving position of the automatic focusing unit 100 in the horizontal Y axial direction.

Herein, although not shown in the drawings, the yokes 214 and 224 mounted next to the Hall sensors 810 and 820 may entirely cover the Hall sensors 810 and 820 to improve sensitivity of the Hall sensors 810 and 820 according to cases. In this case, magnet fields of the corresponding magnets 211 and 221 face the yokes 214 and 224 and therefore linearity is improved, thereby enhancing the sensitivity of the Hall sensors.

The biaxial guide 300 includes an X axial guide unit 310 which is supported to the X axial shaft 410 for supporting the movement of the automatic focusing unit 100 in the horizontal X axial direction to be moved in the X axial direction and a Y axial guide unit 320 which fixes one side of the Y axial shaft 420 for supporting the movement of the automatic focusing unit 100 in the horizontal Y axial direction and is extended in a direction perpendicular to the X axial guide unit 310.

Meanwhile, it is preferable that the one side of the Y axial shaft 420 is bonded and fixed to a fixed unit 321 formed on the Y axial guide unit 320 of the biaxial guide 300.

That is, the Y axial shaft 420 and the biaxial guide 300 can be moved together with the automatic focusing unit 100 in the X axial direction in moving the automatic focusing unit 100 in the horizontal X axial direction.

The housing 500 supplies a space to install the automatic focusing unit 100, the driving unit 200 and the biaxial guide 300 and includes an X axial shaft fixing unit fixing both sides of the X axial shaft 410 and a Y axial shaft moving unit supporting the other side of the Y axial shaft 420 to move it in the X axial direction.

That is, the X axial shaft fixing unit of the housing 500 includes a plurality of grooves 511 inserting and fixing the both sides of the X axial shaft 410 and the Y axial shaft moving unit of the housing 500 includes a slit-shaped groove 521 which inserts and supports the other side of the Y axial shaft 420 and has a length in the X axial direction to entirely slide the Y axial shaft 420 in the X axial direction.

Meanwhile, as shown in FIG. 2 and FIG. 4, in accordance with the one embodiment of the present invention, the optical image stabilizing apparatus for the micro-camera module may further include a tilt preventing member 700 to prevent a tilt of the automatic focusing unit 100 by being provided at a corner opposing the biaxial guide 300 among corners of the housing 500.

Herein, the tilt preventing member 700 is detachably coupled to a coupling hole 507 formed at the corner of the housing 500 and formed by a bar coupled to an insertion groove (not shown) formed at a corner of the automatic focusing unit 100 corresponding to the corner of the housing 500.

Hereinafter, a correction process of the optical image stabilizing apparatus for the micro-camera module in accordance with one embodiment of the present invention will be described.

First of all, in order to move the automatic focusing unit 100 in the horizontal X axial direction, when operating the X axial moving actuator 220 of the driving unit 200, the automatic focusing unit 100 is moved along the X axial shaft 410 through the X axial shaft coupling unit 110 in the X axial direction.

And, when the automatic focusing unit 100 is moved in the horizontal X axial direction, the Y axial shaft 420 and the entire biaxial guide 300 are moved in the X axial direction.

At this time, the automatic focusing unit 100 can be stably moved in the horizontal X axial direction by binding vertical rotation along an X axis through a coupling structure between the Y axial shaft coupling unit 120 and the Y axial shaft 420.

Then, in order to move the automatic focusing unit 100 in the horizontal Y axial direction, when operating the Y axial moving actuator 210 of the driving unit 200, the automatic focusing unit 100 is moved along the Y axial shaft 420 through the Y axial shaft coupling unit 120 in the Y axial direction.

At this time, the automatic focusing unit 100 can be stably moved in the horizontal Y axial direction by binding vertical rotation along a Y axis through a coupling structure between the X axial shaft coupling unit 110 and the X axial shaft 410

As described above, in accordance with the present invention, the optical image stabilizing apparatus for the micro-camera module is capable of effectively stabilizing the image of the camera module and implementing miniaturization of the camera module by supplying the "L"-shaped biaxial guide structure to prevent the tilt in the Y axial direction while moving the automatic focusing unit of the camera module in the horizontal X axial direction and to prevent the tilt in the X axial direction while moving the automatic focusing unit of the camera module in the horizontal Y axial direction.

As described above, although the preferable embodiment of the present invention has been shown and described, it will be appreciated by those skilled in the art that substitutions, modifications and changes may be made in this embodiment without departing from the principles and spirit of the general inventive concept, the scope of which is defined in the appended claims and their equivalents.

What is claimed is:

1. An optical image stabilizing apparatus for a micro-camera module comprising:
   an automatic focusing unit mounting a lens barrel with a lens group;
   a driving unit moving the automatic focusing unit in a horizontal X axial direction or a horizontal Y axial direction;
   a biaxial guide including an X axial guide unit supported to an X axial shaft supporting movement of the automatic focusing unit in the horizontal X axial direction to be moved in an X axial direction and a Y axial guide unit which fixes one side of a Y axial shaft supporting movement of the automatic focusing unit in the horizontal Y axial direction and is extended in a direction perpendicular to the X axial guide unit; and
   a tilt preventing member to prevent a tilt of the automatic focusing unit by being provided at a corner opposing the biaxial guide among corners of a housing.

2. The optical image stabilizing apparatus for the micro-camera module of claim 1, further comprising:
   the housing supplying a space to install the automatic focusing unit, the driving unit and the biaxial guide and including an X axial shaft fixing unit fixing both sides of the X axial shaft and a Y axial shaft moving unit supporting the other side of the Y axial shaft to move the other side of the Y axial shaft in the X axial direction.

3. The optical image stabilizing apparatus for the micro-camera module of claim 2, wherein the X axial shaft fixing unit includes a plurality of grooves to insert and fix the both sides of the X axial shaft.

4. The optical image stabilizing apparatus for the micro-camera module of claim 2, wherein the Y axial shaft moving unit includes a slit-shaped groove with a length in the X axial direction to insert and support the other side of the Y axial shaft.

5. The optical image stabilizing apparatus for the micro-camera module of claim 1, wherein the tilt preventing member is detachably coupled to the corner of the housing and comprises a bar coupled to an insertion groove formed at a corner of the automatic focusing unit corresponding to the corner of the housing.

6. The optical image stabilizing apparatus for the micro-camera module of claim 1, further comprising an X axial shaft coupling unit coupled to the X axial shaft and formed on a side face of the automatic focusing unit corresponding to the X axial shaft and a Y axial shaft coupling unit coupled to the Y axial shaft is formed on another side face of the automatic focusing unit corresponding to the Y axial shaft.

7. The optical image stabilizing apparatus for the micro-camera module of claim 6, wherein the X axial shaft coupling unit is slid in an axial direction of the X axial shaft in moving the automatic focusing unit in the horizontal X axial direction and slid in a circumferential direction of the X axial shaft in moving the automatic focusing unit in the horizontal Y axial direction.

8. The optical image stabilizing apparatus for the micro-camera module of claim 6, wherein the Y axial shaft coupling unit is moved in a moving direction of the automatic focusing unit together with the Y axial shaft in moving the automatic focusing unit in the horizontal X axial direction and slid in an axial direction of the Y axial shaft in moving the automatic focusing unit in the horizontal Y axial direction.

9. The optical image stabilizing apparatus for the micro-camera module of claim 1, wherein the driving unit includes a Y axial moving actuator moving the automatic focusing unit in the horizontal Y axial direction by being installed on a lateral side of the automatic focusing unit corresponding to the X axial shaft and an X axial moving actuator moving the automatic focusing unit in the horizontal X axial direction by being installed on another lateral side of the automatic focusing unit corresponding to the Y axial shaft.

10. The optical image stabilizing apparatus for the micro-camera module of claim 9, wherein the X and Y axial moving actuators include magnets fixed to the automatic focusing unit and voice coils installed at upper parts of the magnets respectively.

11. The optical image stabilizing apparatus for the micro-camera module of claim 1, wherein the one side of the Y axial shaft is bonded and fixed to the Y axial guide unit of the biaxial guide.

12. The optical image stabilizing apparatus for the micro-camera module of claim 1, further comprising:
 a position detection device provided on the driving unit to detect a moving position of the automatic focusing unit in the horizontal X axial direction or a moving position thereof in the horizontal Y axial direction.

* * * * *